United States Patent
Ayme et al.

(10) Patent No.: US 8,540,189 B2
(45) Date of Patent: Sep. 24, 2013

(54) CABLE WAY FOR AIRCRAFT WITH A STRUCTURE MADE OF COMPOSITE MATERIAL

(75) Inventors: Arnaud Camille Ayme, Toulouse (FR); Serge Thierry Roques, Cornebarrieu (FR)

(73) Assignee: Labinal, Blagnac (FR)

( * ) Notice: Subject to any disclaimer, the term of this patent is extended or adjusted under 35 U.S.C. 154(b) by 400 days.

(21) Appl. No.: 12/888,079

(22) Filed: Sep. 22, 2010

(65) Prior Publication Data

US 2011/0068228 A1    Mar. 24, 2011

(30) Foreign Application Priority Data

Sep. 23, 2009   (FR) ..................... 09 56578

(51) Int. Cl.
*B64C 1/00*       (2006.01)

(52) U.S. Cl.
USPC ......................................... 244/119; 244/131

(58) Field of Classification Search
USPC .......... 244/119, 129.2, 129.1, 131; 174/68.1, 174/68.3, 72 A, 72 R, 88 R, 70 C, 95
See application file for complete search history.

(56) References Cited

U.S. PATENT DOCUMENTS

| | | | | |
|---|---|---|---|---|
| 3,894,706 A | * | 7/1975 | Mizusawa | 248/68.1 |
| 4,566,660 A | * | 1/1986 | Anscher et al. | 248/74.2 |
| 4,669,688 A | * | 6/1987 | Itoh et al. | 248/74.2 |
| 4,700,913 A | * | 10/1987 | Hirano et al. | 248/73 |
| 4,865,280 A | * | 9/1989 | Wollar | 248/68.1 |
| 6,320,134 B1 | * | 11/2001 | Rehberg et al. | 174/135 |
| 6,811,121 B2 | * | 11/2004 | Lambiaso | 244/129.1 |
| 7,419,124 B2 | * | 9/2008 | Zeuner et al. | 248/68.1 |

FOREIGN PATENT DOCUMENTS

| | | |
|---|---|---|
| DE | 10 2007 061 425 A1 | 7/2009 |
| EP | 0 184 931 A2 | 6/1986 |
| EP | 1 355 397 A1 | 10/2003 |
| FR | 2 306 051 A1 | 10/1976 |
| FR | 2 904 804 A1 | 2/2008 |
| FR | 2 905 038 A1 | 2/2008 |
| FR | 2 925 781 A1 | 6/2009 |

OTHER PUBLICATIONS

U.S. Appl. No. 12/896,343, filed Oct. 1, 2010, C. Ayme, et al.

* cited by examiner

*Primary Examiner* — Tien Dinh
*Assistant Examiner* — Keith L Dixon
(74) *Attorney, Agent, or Firm* — Oblon, Spivak, McClelland, Maier & Neustadt, L.L.P.

(57) ABSTRACT

A retention device, in the form of a trunking with a substantially U-shaped section, for retaining at least one cable running along the structure of an aircraft, fastened to said structure by a fastening device and providing an electrical continuity over the whole of its length is disclosed. The device is electrically connected to a current-return circuit from the items of equipment of the aircraft. The trunking includes at least one curve on its longitudinal axis corresponding substantially to that of a frame of a fuselage. It is intended to be mounted on a frame of an aircraft made of carbon fibers and to protect the skin of the aircraft against a possible contact with a damaged cable.

13 Claims, 2 Drawing Sheets

CABLE WAY FOR AIRCRAFT WITH A STRUCTURE MADE OF COMPOSITE MATERIAL

BACKGROUND OF THE INVENTION

1. Field of the Invention

The field of the present invention is that of wiring and more particularly that of wiring of aircraft and their fastening.

2. Description of the Related Art

The structure of an aircraft is conventionally achieved by a series of circular frames, supported by longitudinal frame members and positioned evenly along the fuselage, to which bars called stringers are fastened. The skin of the aircraft is attached to this network of frames and stringers.

The cells of aircraft, whether they be airplanes or helicopters, are conventionally made of metal which has a certain number of advantages. In particular, the conductive character of metal makes it possible to achieve the following functions:

- production of an electrical network for the return of current from the items of equipment of the airplane; the items of equipment are thus electrically connected, for the phase, to a wire carrying the electric current and, for the neutral, to the structure of the aircraft. There is therefore no need to put in place a specific current-return network.
- common earthing of the items of equipment, which makes it possible to protect these items of equipment as well as the passengers,
- creation of a common potential reference allowing the items of equipment to all have the same potential reference and to work in the same electrical voltage range,
- protection, by a Faraday cage effect, against the direct and indirect effects of lightning which could injure the passengers and destroy the items of electrical equipment on board, and finally
- production of effective electromagnetic protection against electromagnetic radiation; specifically, when an electrical conductor is subjected to an electromagnetic field, a voltage, called an induced voltage, appears between its two ends and may cause interference, or even damage to the electrical receivers that are connected thereto. These electromagnetic fields may be created either by the radiation of an antenna or of a radar (particular directional radiation), or by circulation currents due to lightning strike and which will travel over the surface (which is more or less conductive) of the structure of an airplane (indirect effects of the lightning), or else by currents of high intensity which travel in the power cables of the internal electrical network of the aircraft.

The technology of aircraft cells has however evolved and the designers are turning increasingly to the use of composite materials which have good performance with respect to weight and mechanical strength and in particular to the use of carbon fibre composites.

The result of this is that the functions indicated above are no longer performed, the electrical conductivity of these composite materials being relatively low. It is therefore necessary, on aircraft made of composite material, to recreate the functions formerly performed by the metal structure of the aircraft. For this, a first evolution has been invented which consists of installing along the structure of the airplane metal or metalized cable supports in the form of trunking in which the electric cables are fastened. This linear trunking, with a U-shaped section, runs along the fuselage to perform the functions listed above. One example of such trunking is given by European Patent Application EP 0184931 by British Aerospace. In addition, European Patent Application EP1355397 by the British company C & C Marshall Ltd is known, which describes trunking connectors designed to cause cables to bend. Because of their small radius of curvature and their bulk associated with this radius of curvature, these connectors are not suitable for the installation of cables along or parallel to the frames of a fuselage, the radius of curvature of which is much larger. In addition, these bends place the cables between the trunking and the wall of the airplane, which is particularly harmful with respect to the risk of short-circuit on airplanes made of composite material as explained below.

In carbon fibre structures (or structures called CFRP) it is essential to prevent electric wires, even those in which low-intensity currents travel, from being able to come into contact with the structure. In case of breakage of a cable or a contact of this cable with the structure of the airplane, a short-circuit appears with which are associated a local heating and a possible catching-fire of the carbon and the resin contained by the structure. Such a phenomenon would cause the emission of toxic fumes for the passengers.

The problem is particularly acute for cables designed to follow a curved trajectory, like those mounted along the frames of the aircraft, or else those that are fastened to stringers and that run parallel to the frames of the aircraft. Aviation cables are usually relatively rigid and tend to resist the bending that they sustain. The stresses sustained, associated with the vibrations, may cause, with ageing, tears in the outer insulation and the breaking of a wire. The latter then stands up and can naturally come into contact with the skin of the airplane.

It is therefore appropriate to anticipate such a problem and to find a means for protecting the portions of an airplane made of carbon fiber against the inadvertent breakages of cables running along the frames of the airplane or parallel to the latter.

BRIEF SUMMARY OF THE INVENTION

The object of the present invention is to remedy these drawbacks by proposing a device for fastening the bent electric cables along or parallel to the frames of the fuselage of an aircraft, for an aircraft made at least partially of composite material, which performs the functions previously performed by the metal structure of said aircraft and a protection against possible short-circuits between a cable and the structure made of composite material.

Accordingly, the subject of the invention is a cable retention device, in the form of trunking, arranged to receive at least one cable and provide an electrical continuity over the whole of its length, wherein said trunking comprises at least one curve on its longitudinal axis the value of which corresponds substantially to the curvature of the frames of the fuselage of an aircraft, its radius being greater than one meter.

The presence of a trunking having the curvature of a frame of the aircraft, that is to say a value of their radius of curvature expressed in meters and not in centimeters, makes it possible to place thereon the cables which run transversely to the longitudinal axis of the fuselage and thus to protect the frames and the skin of the aircraft against a possible short-circuit.

Preferably, the curve of the longitudinal axis is situated in the plane of the bottom of the trunking. The latter is thus adapted to a mounting on the lateral face of a frame.

Alternatively, the curve of the longitudinal axis is situated in a plane perpendicular to the bottom of the trunking. The latter is then suitable for a mounting by fastening onto the stringers, parallel to the frames of the aircraft.

In a particular embodiment, the trunking is substantially U-shaped and comprises at least one stopper designed to hold the cable against the bottom of the U.

Preferably, said stopper comprises two branches which extend along the walls of the U and have an elasticity giving them a degree of freedom in the direction transverse to the trunking.

Yet more preferably, the face of said branches which is in contact with the walls of the trunking has at least one non-return device which opposes the withdrawal of the stopper after it has been put in place.

Advantageously, said branches have, at rest, a position diverging from one another so that the stopper exerts a pressure against the walls of the trunking when it is inserted therein.

Advantageously, the trunking comprises, on its outer face, lugs designed to provide the electrical connection of its metal portion to a current-return circuit of an aircraft.

The invention also covers the use of a device as described above for retaining a cable running along a transverse frame of an aircraft.

Preferably, the fastening means holds in position an insulation mat of the fuselage of said aircraft with the aid of a means for fastening the trunking to the structure of an aircraft.

The present invention also relates to an aircraft fuselage comprising at least one cable-retention device as described above.

Preferably, the aircraft fuselage comprises at least one structural portion made of carbon fibers.

In a particular embodiment, at least one frame made of carbon fibers carries a retention device as described above.

In another particular embodiment, the fuselage comprises at least one retention device as described above which is fastened to stringers parallel to the frames of the aircraft.

BRIEF DESCRIPTION OF THE SEVERAL VIEWS OF THE DRAWINGS

The invention will be better understood, and other objects, details, features and advantages of the latter will appear more clearly during the following detailed explanatory description of an embodiment of the invention given as a purely illustrative and non-limiting example, with reference to the appended schematic drawings.

In these drawings.

DETAILED DESCRIPTION OF THE INVENTION

Figure 1:
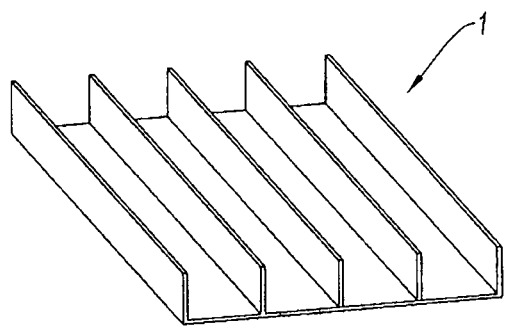
FIG. 1 is a view in perspective of a linear trunking with multiple grooves, according to the prior art.

With reference to FIG. 1, a linear trunking 1, according to the prior art, is shown comprising four grooves with U-shaped sections. In the rest of the description, the word "cable" covers a set of insulated electric wires, usually joined together in one or more bundles which run in the same direction over a fairly long length of the cell of the aircraft. Conventionally, the cables are grouped together in looms which run along the main axis of the aircraft while being installed in U-shaped trunking which keeps them in place and protects them, the trunking itself being fastened to the structure of the aircraft. It is preferably made of a metal, essentially to prevent the effects of lightning or of electromagnetic radiation.

The advantages provided by trunking 1 are many. Its low electric resistance allows it to establish one and the same voltage reference at both its ends; it therefore performs the functions of producing an electric network for the return of current, of common earthing of the items of equipment and of creating a common potential reference. Its conductive surface, when all its walls are metalized, also allows it to form a Faraday cage in order to protect the internal cables against the effects induced from lightning and to protect them against electromagnetic radiation.

Figure 2:
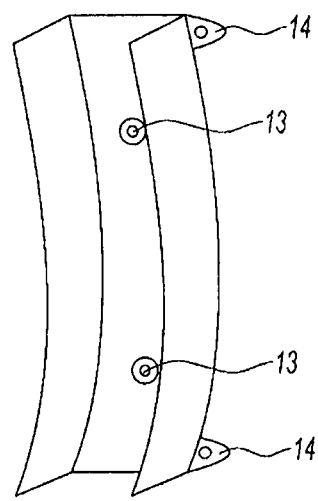
FIG. 2 is a view in perspective of a single curved trunking according to the invention, designed to be installed on a frame of an aircraft.
Figure 3:
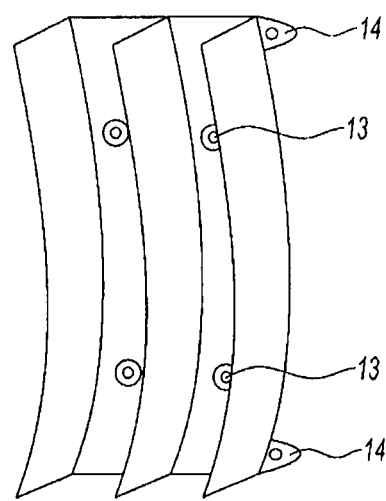
FIG. 3 is a view in perspective of a multiple curved trunking according to the invention, designed to be installed on a frame of an aircraft.

FIGS. 2 and 3 show a trunking 1 according to the invention, single in the case of FIG. 2 and double in the case of FIG. 3, comprising respectively one or two grooves for retaining the cables. This trunking has a curved shape, that is to say having a curve of its longitudinal axis so as to follow the curvature of a frame of the structure of the aircraft, along which, or parallel to which, they are intended to be mounted. In the figures, the curve is made in the plane of the bottom of the trunking and corresponds to a mounting of the trunking on the transverse side of a frame; the curve (not shown) may also be made in a plane perpendicular to the bottom of the trunking for the latter to be mounted on the inner face of a frame or else on stringers, parallel to the frames of the aircraft.

In the event of short-circuit between cables, the trunking represents protection for the adjacent composite structure against the electric arc associated with the short-circuit. Similarly, it prevents any direct contact of the electric cables that are contained therein with the carbon of the skin of the airplane and thus makes it possible to prevent starting a fire with the emission of toxic fumes.

The bottom of the trunking 1 has, at the bottom of each groove, a drillhole 13 through which is intended to pass a means for fastening the trunking 1 to the structure of the aircraft. The drillholes 13 are evenly placed along the trunking 1 and correspond to the maximum acceptable spacing between two consecutive fastening points.

These two trunkings comprise two metal lugs 14 the function of which is to connect the metal trunking 1 to the current-return network which is put in place in the aircraft in order to perform the function of current return for the items of equipment, a function which was performed by the metal structure in aircraft of older design.

Figure 4:
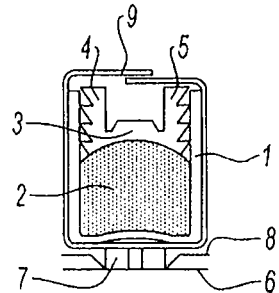
FIG. 4 is a view in section of a trunking according to one embodiment of the invention, enclosing a loom of electrical cables of an aircraft.

Referring now to FIG. 4, a trunking 1 according to the invention can be seen, with a U-shaped section, in which a cable 2 or a loom of cables is positioned. The section is made at the point 13 for fastening the trunking 1 to the structure 6 of the aircraft. The cable 2 is held in place in the bottom of the U by a retaining stopper 3 which applies a pressure to the cable in the direction of the bottom of the U. This stopper has, in section, a lower face which matches the external shape of the cable so as not to damage it while exerting on it a uniformly distributed pressure, and has, towards the top, two branches 4 which extend along the walls of the U; an upper face completes the stopper while joining the two branches to their lower portion. These two branches 4, which extend over the upper face, have a certain elasticity so as to give them a degree of freedom in the direction transverse to the trunking and therefore to allow them to come close to one another in order to make the insertion of the stopper 3 into the trunking 1 easier. The lateral face of these branches 4, which is in contact with the walls of the trunking 1, has non-return devices 5, shown here in the form of teeth which rub on said walls and oppose the withdrawal of the stopper 3 after it has been put in place. Accordingly, the branches 4 have, at rest, with the stopper being withdrawn from the trunking, a divergent position relative to one another so as to exert a pressure against the walls of the trunking 1 when the stopper is inserted therein and when they are parallel with one another.

Still with reference to FIG. 4, the trunking 1 is attached to an element of the structure 6 of the aircraft by a fastening means 7, known to those skilled in the art, such as for example a rivet. Such fastening means are positioned, in a known manner, at intervals on the structure 6, the length of the cable way, in order to hold the trunking 1 to the aircraft.

At each point for fastening the trunking 1 to the structure 6 of the aircraft, the trunking receives a stopper 3 and the assembly formed by the trunking 1, the cable 2 and the stopper 3 is secured by a cable tie 9, like those marketed under the Ty-Rap brand by Thomas & Betts. These ties, usually made of plastic, have the shape of a stem which surrounds the elements to be assembled and which closes on itself by passing through a loop comprising a non-return locking system. The portion of the stem that passes through this loop after locking is usually cut off in order to dispose of the excess portion.

The walls of an aircraft are, in a known manner, covered with an insulation mat 8 which tends to insulate the inside of the fuselage of the aircraft both from heat and sound. The trunkings 1 are in this instance fastened to the structure of the aircraft by passing through this insulation mat 8. The fastening means 7, which pass through the mat 8 at the points for coupling to the structure 6, thus participate in keeping this mat in place on the aircraft.

Figure 5:
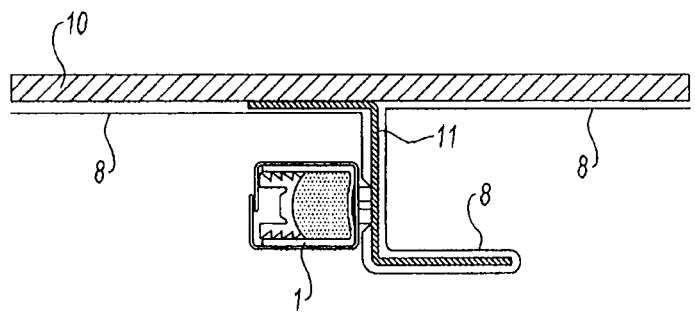
FIG. 5 is a view in section of a trunking according to one embodiment of the invention, installed on a frame of an aircraft.
Figure 6:
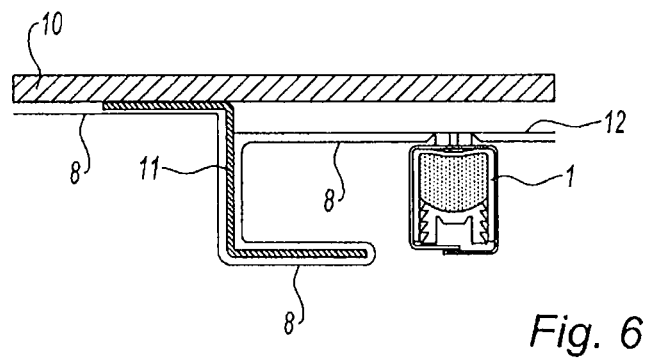
FIG. 6 is a view in section of a trunking according to one embodiment of the invention, installed on a stringer of an aircraft.

With reference now to FIGS. 5 and 6, the positioning of a trunking 1 on the structure 6 of the aircraft is shown. FIG. 5 shows in section a longitudinal frame member 10 supporting a frame 11 on the lateral face of which a trunking 1 is fastened as described above. The insulation mat 8 carpets the skin of the airplane and travels round the frame 11 to which it is held in place by, amongst other things, the means 7 for fastening the trunking 1. FIG. 6 shows a longitudinal frame member 10 and a frame 11; a stringer 12, supporting the trunking 1, is fastened to the longitudinal frame member 10 and to the frame 11 and extends in the longitudinal direction of the aircraft. In this figure, the insulation mat 8 covers the stringer 12 after having passed round the frame 11 and is held in place by the means 7 for fastening the trunking 1.

To perform the functions previously performed by the metal structure on an aircraft of which at least a portion of this structure is made of composite material, a trunking 1 according to the invention comprises a metal element over the whole of its length which provides the electrical continuity from one of the ends of the trunking to the other. It may, for example, be made in the form of a section piece originating either from a folding of a thin metal sheet, from an extruded section piece or from a section piece molded in aluminum, or from an extruded plastic trunking which is then metalized on the inside by a conductive deposit under vacuum or by an electrolytic deposit. Its metal portion is also connected, for example by means of lugs 14, to the current-return network put in place on the aircraft. This gives an electrical continuity for the current-return network.

It is also possible to add to the trunking 1 an inner coating of a material such as polytetrafluoroethylene (or PTFE, more widely known under the brand name Teflon), which makes it possible to avoid abrading the insulation of the cables and to reduce the risk of short-circuit within the loom.

Finally, these trunkings have the advantage of immobilizing the insulation mat 8 and of preventing it from moving under the action of the vibrations in flight.

Although the invention has been described with reference to a particular embodiment, it is evident that it comprises all the technical equivalents of the means described and their combinations if the latter form part of the context of the invention.

The invention claimed is:

1. A cable retention device arranged to receive at least one cable, comprising:
   a trunking extending along a longitudinal axis comprising at least one curve, said trunking including a metal portion ensuring an electrical continuity over an entire length thereof, and presenting a U-shaped cross section with first and second side walls and a bottom wall connecting said first and second side walls; and
   a retaining stopper which cooperates with said trunking to hold said cable against said bottom wall of said trunking such that said cable is sandwiched between said bottom wall of said trunking and said stopper,
   wherein a value of said curve of said trunking corresponds substantially to a curvature of frames of a fuselage of an aircraft, a radius of said curve being greater than one meter.

2. The retention device as claimed in claim 1, wherein the curve of the longitudinal axis is situated in the plane of the bottom of the trunking.

3. The retention device as claimed in claim 1, wherein the curve of the longitudinal axis is situated in a plane perpendicular to the bottom of the trunking.

4. The retention device as claimed in claim 1, wherein said stopper comprises two branches which extend along the side walls of the trunking and have an elasticity giving said branches a degree of freedom in a plane transverse to the longitudinal axis of the trunking.

5. The retention device as claimed in claim 4, wherein said stopper further comprises a central portion including lower face with a shape substantially corresponding to an external shape of the cable and an upper face to which lower portions of said branches are joined.

6. The retention device as claimed in claim 5, wherein said branches extend away from the central portion of said stopper.

7. The retention device as claimed in claim 4, wherein a face of said branches in contact with the side walls of the trunking has at least one non-return device which opposes withdrawal of the stopper after said stopper has been put in place.

8. The retention device as claimed in claim 4, wherein said branches have, at rest, a position diverging from one another so that the stopper exerts a pressure against the walls of the trunking when said stopper is inserted therein.

9. The retention device as claimed in claim 1, wherein the trunking comprises, on its outer face, lugs designed to provide the electrical connection of its metal portion to a current-return circuit of an aircraft.

10. An aircraft fuselage comprising at least one cable-retention device as claimed in claim 1.

11. The aircraft fuselage as claimed in claim 10, further comprising at least one structural portion made of carbon fibers.

12. The aircraft fuselage as claimed in claim 11, wherein at least one frame made of carbon fibers carries the retention device.

13. The aircraft fuselage as claimed in claim 11, wherein the retention device is fastened to stringers parallel to the frames of the aircraft.

\* \* \* \* \*